US006508319B1

(12) United States Patent
Langenfeld et al.

(10) Patent No.: US 6,508,319 B1
(45) Date of Patent: Jan. 21, 2003

(54) AUTOMOBILE INGRESS/EGRESS SYSTEM

(75) Inventors: Christopher C. Langenfeld, Nashua, NH (US); Stanley B. Smith, III, Henniker, NH (US)

(73) Assignee: Deka Products Limited Partnership, Manchester, NH (US)

(*) Notice: Subject to any disclaimer, the term of this patent is extended or adjusted under 35 U.S.C. 154(b) by 0 days.

(21) Appl. No.: 09/276,326

(22) Filed: Mar. 25, 1999

Related U.S. Application Data

(60) Provisional application No. 60/079,358, filed on Mar. 25, 1998.

(51) Int. Cl.[7] .......................... B60K 1/00; B62D 57/036

(52) U.S. Cl. ...................... 180/65.1; 180/65.8; 180/7.1; 280/250.1; 280/304.1

(58) Field of Search ........................... 280/250.1, 304.1, 280/807, 751; 180/65.1, 7.1, 167, 6.5, 8.2, 907, 65.8; 296/65.12, 65.13, 65.15, 65.01; 297/346, 347, 335; 414/921; 701/93; 318/625; 91/363 A; 56/11.9

(56) References Cited

U.S. PATENT DOCUMENTS

| | | | | | |
|---|---|---|---|---|---|
| 3,882,949 | A | | 5/1975 | Anderson | 180/8 A |
| 4,103,934 | A | * | 8/1978 | Arnholt et al. | 297/335 |
| 4,398,858 | A | | 8/1983 | Paffrath | 414/462 |
| 4,479,752 | A | * | 10/1984 | Todd | 296/65.12 |
| 4,483,653 | A | * | 11/1984 | Waite | 414/921 |
| 4,542,679 | A | * | 9/1985 | Murphy et al. | 91/363 A |
| 4,542,917 | A | * | 9/1985 | Waite | 280/650 |
| 4,551,060 | A | * | 11/1985 | Quercy | 414/921 |
| 5,466,111 | A | * | 11/1995 | Meyer | 280/250.1 |
| 5,502,957 | A | * | 4/1996 | Robertson | 56/11.9 |
| 5,635,807 | A | * | 6/1997 | Lautzenhiser | 318/625 |
| 5,674,041 | A | * | 10/1997 | Smith, Jr. et al. | 280/304.1 |
| 5,701,965 | A | | 12/1997 | Kamen et al. | 180/7.1 |
| 5,794,730 | A | * | 8/1998 | Kamen | 180/7.1 |
| 5,884,563 | A | * | 3/1999 | Sheldon et al. | 414/921 |
| 5,884,929 | A | * | 3/1999 | Kincaid | 280/304.1 |
| 6,003,624 | A | * | 12/1999 | Jorgensen et al. | 180/7.1 |
| 6,149,528 | A | * | 11/2000 | Volz et al. | 472/43 |

FOREIGN PATENT DOCUMENTS

| | | |
|---|---|---|
| DE | 3128112 A1 | 2/1983 |
| DE | 3413412 A1 | 10/1985 |
| JP | 6-105415 | 12/1989 |

* cited by examiner

*Primary Examiner*—Brian L Johnson
*Assistant Examiner*—Hau Phan
(74) *Attorney, Agent, or Firm*—Bromberg & Sunstein LLP

(57) ABSTRACT

A system for enabling a person to enter an enclosed vehicle such as an automobile and to load a personal vehicle such as a wheelchair into the enclosed vehicle. A force sensing handle facilitates control of the personal vehicle by the subject who is no longer supported by the personal vehicle or by another person. In some embodiments of the invention, a transfer mechanism is provided from within the enclosed vehicle for transferring the subject to a seat of the enclosed vehicle.

5 Claims, 14 Drawing Sheets

AUTOMOBILE INGRESS/EGRESS SYSTEM

The present application claims priority from U.S. provisional application No. 60/079,358, filed Mar. 25, 1998, which is herein incorporated by reference.

TECHNICAL FIELD

The present invention pertains to a system for allowing a person to board or disembark from an automobile or other enclosed vehicle and to load a motorized personal vehicle into or out of the enclosed vehicle.

BACKGROUND OF THE INVENTION

It is often necessary or advantageous for a person to have a single personal vehicle, such as a wheelchair, motorized or otherwise, available for locomotion both prior to and after being transported in an automobile or other closed conveyance. Methods currently employed for allowing a person to board an enclosed conveyance along with a personal vehicle require either a long ramp with a gradual incline to allow the person to roll up to the level of the passenger compartment of the conveyance, or, otherwise, require the assistance of another person. Lifts employed for this purpose tend to be both cumbersome and expensive.

SUMMARY OF THE INVENTION

In accordance with one aspect of the invention, in one of its embodiments, there is provided a system for enabling a person to enter and exit an enclosed vehicle, such as a car, bus, or train, and to load a personal vehicle into the enclosed vehicle without the assistance of another person. Where the personal vehicle has a support, a first actuator for driving at least one wheel rotatable about an axis, and a second actuator for varying the disposition of the axis with respect to the support, the system has a control loop for energizing at least one fo the first and second actuators on the basis of at least the disposition of the axis with respect to the support, and also a control input for providing commands to the control loop of the personal vehicle for governing the operation of the personal vehicle and for causing the personal vehicle to enter and exit the enclosed vehicle.

In accordance with another embodiment of the invention, the control loop may have a force sensing device for governing the operation of a motorized personal vehicle. The force sensing device has a handle coupled to the personal vehicle for grasping by a subject, at least one pressure sensor for producing an output related to forces applied to the handle, and a controller for varying at least one of the orientation, configuration, and motion of the personal vehicle on the basis of forces applied to the handle. One or more of the pressure sensors may be a piezoelectric force sensor.

The system may have a transfer mechanism deployable from inside the enclosed vehicle for supporting the person during transfer between the personal vehicle and the seat and a control input for providing commands to the personal vehicle for governing the operation of the personal vehicle and for causing the personal vehicle to board the enclosed vehicle. The transfer mechanism may be a stowable seat disposed within the enclosed vehicle. The personal vehicle may have a support for supporting the person and a ground contacting element, such as a wheel, that is movable with respect to a local axis, and the local axis may itself be movable with respect to a second axis having a defined relation with respect to the support. An actuator arrangement may be provided for permitting controllable motion of the ground contacting element with respect to the local axis and of the local axis with respect to the support. A controller then receives the commands from the control input and controls the actuator arrangement in such a manner as to cause the personal vehicle to board the enclosed vehicle.

In accordance with yet another alternate embodiment of the invention, there is provided a stowable seat for an automobile, the seat having a normal position for seating a passenger. The stowable seat has a retraction mechanism for removing the stowable seat from the normal position to a retracted position, and a transfer mechanism for conveying a person from a personal vehicle to a seated position within the automobile.

BRIEF DESCRIPTION OF THE DRAWINGS

The invention will be more readily understood by reference to the following description, taken with the accompanying drawings, in which.

DETAILED DESCRIPTION OF PREFERRED EMBODIMENTS

Figure 1:
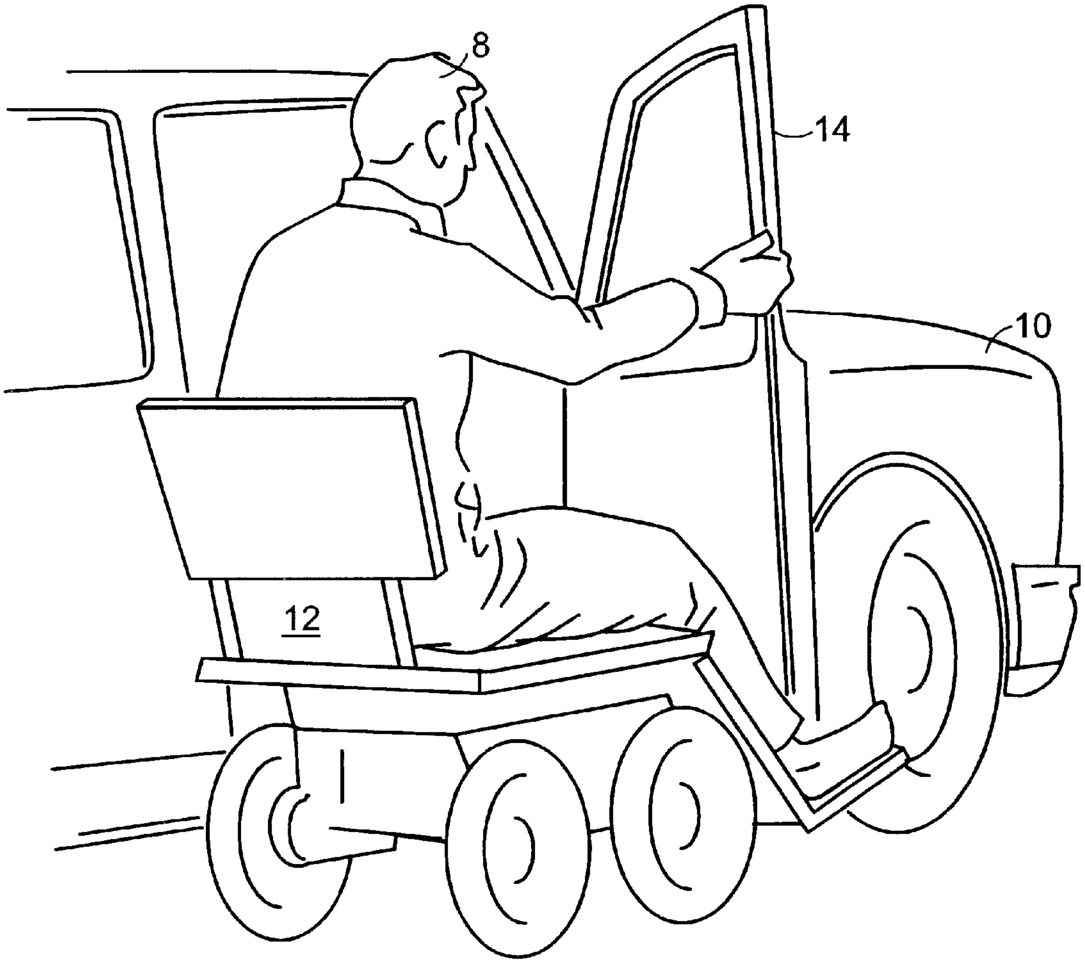
FIG. 1 is a perspective view of a user seated on a personal vehicle prior to boarding the passenger cabin of an automobile, in accordance with a preferred embodiment of the invention.

FIGS. 1–4, with identical numerals designating identical or similar elements of an embodiment of the invention, represent temporally successive views, in which a person 8 is shown entering an automobile 10 from a personal vehicle 12 and then loading the personal vehicle into the automobile. Referring to FIG. 1, automobile 10 is shown as an example of an enclosed vehicle to which the current invention is applicable though application to other enclosed conveyances such as trucks, buses, or trains, is within the scope of the invention. While the right side of automobile 10 is shown in the figures as the passenger side of the automobile, mirror-imaging of automobile 10 about its center-line of automobile 10 is also within the scope of the invention and of the appended claims. Subject 8 is depicted as seated on personal vehicle 12, shown, by way of example, as a wheelchair. The invention is applicable to any personal vehicle, motorized or otherwise, upon which subject 8 may be seated or otherwise disposed. In particular, the invention is applicable to a personal vehicle designed to maintain balance while surmounting obstacles, such as embodiments of the invention described in U.S. Pat. No. 5,701,965 which is hereby incorporated herein by reference.

Figure 2:
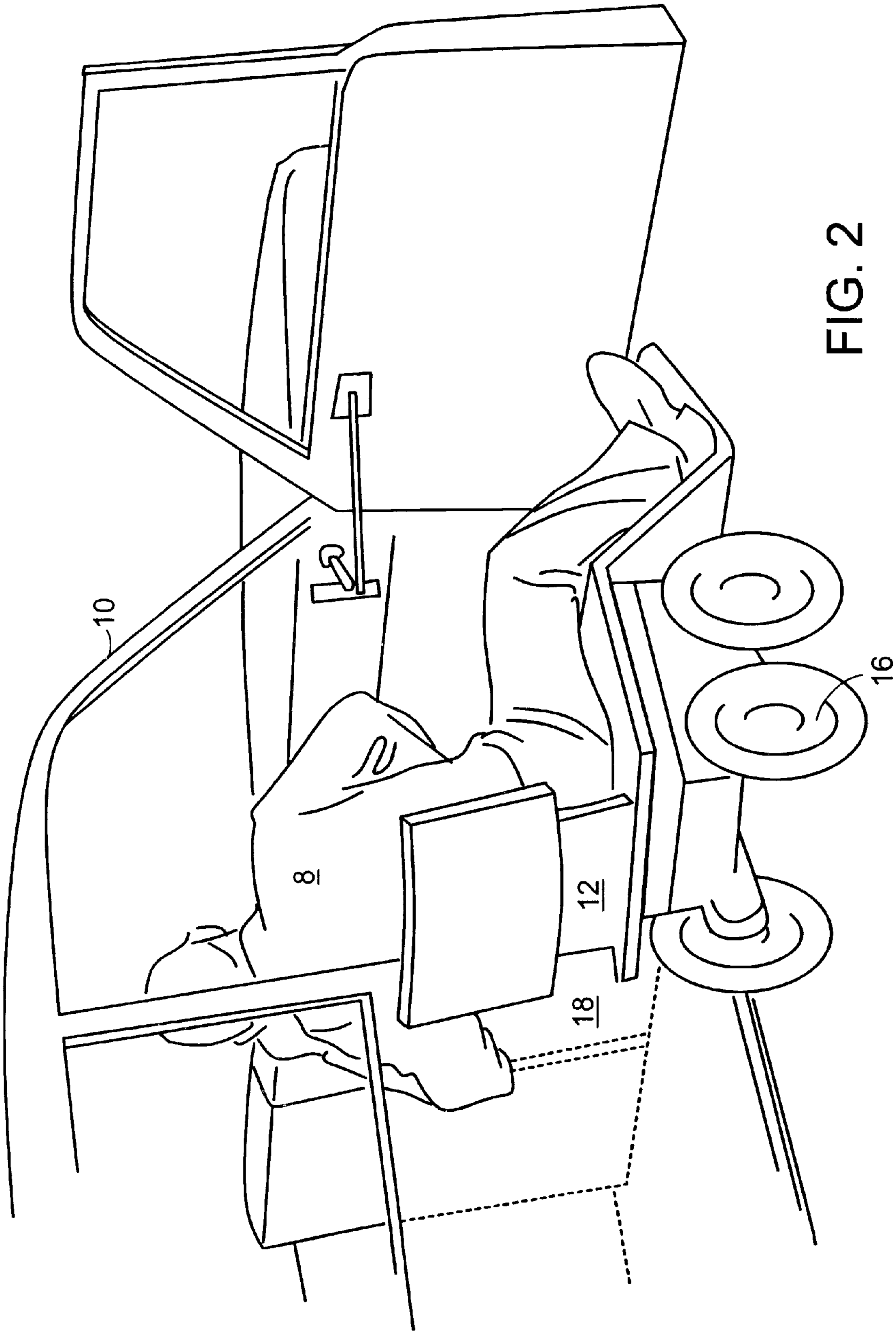
FIG. 2 shows the user beginning to transfer himself to the passenger cabin of the automobile of FIG. 1.

To enter automobile 10 without the assistance of another person, in accordance with a preferred embodiment of the invention, subject 8 may open door 14 of automobile 10 and position personal vehicle 12 adjacent to the passenger side of automobile 10. The opening of door 14 may be manual or powered within the scope of the invention. Referring now to FIG. 2, subject 8, once positioned on personal vehicle 12 adjacent to automobile 10, may lock wheels 16 of the personal vehicle and transfer himself to a transfer mechanism, which, in accordance with a preferred embodiment of the invention, may be a passenger seat 18.

Figure 11:
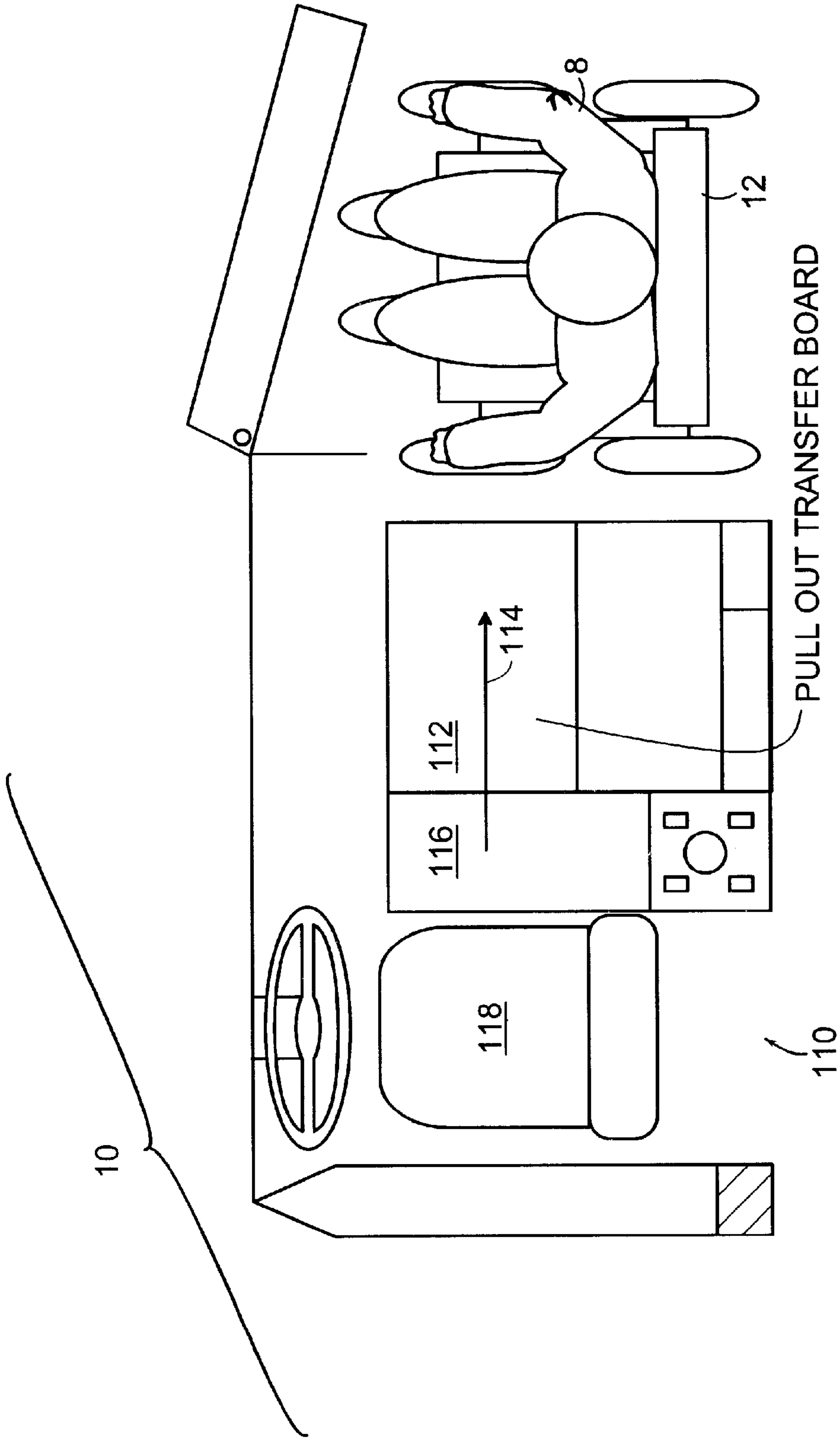
FIG. 11 shows a top view of the passenger cabin of an automobile employing a transfer board to facilitate the transfer of a person from a personal vehicle to the passenger seat of an automobile in accordance with an alternate embodiment of the invention.

Referring to FIG. 11, in which passenger cabin 110 of automobile 10 is shown, a transfer board 112 may be provided in accordance with an alternate embodiment of the invention. Transfer board 112 may be extended in direction 114 toward subject 8 positioned outside of automobile 10 either by manual reach or by remote command. Transfer board 112 may be retained and thereby supported both vertically and laterally by transfer mechanism 116. Subject 8 may use transfer board 112 to transfer out of personal vehicle 10 to driver's seat 118, with subject's weight being supported by transfer board 112 to the extent required. Transfer board 112 is configured so as to be easily held by subject 8 during the course of the transfer to driver's seat 118.

Figure 3:
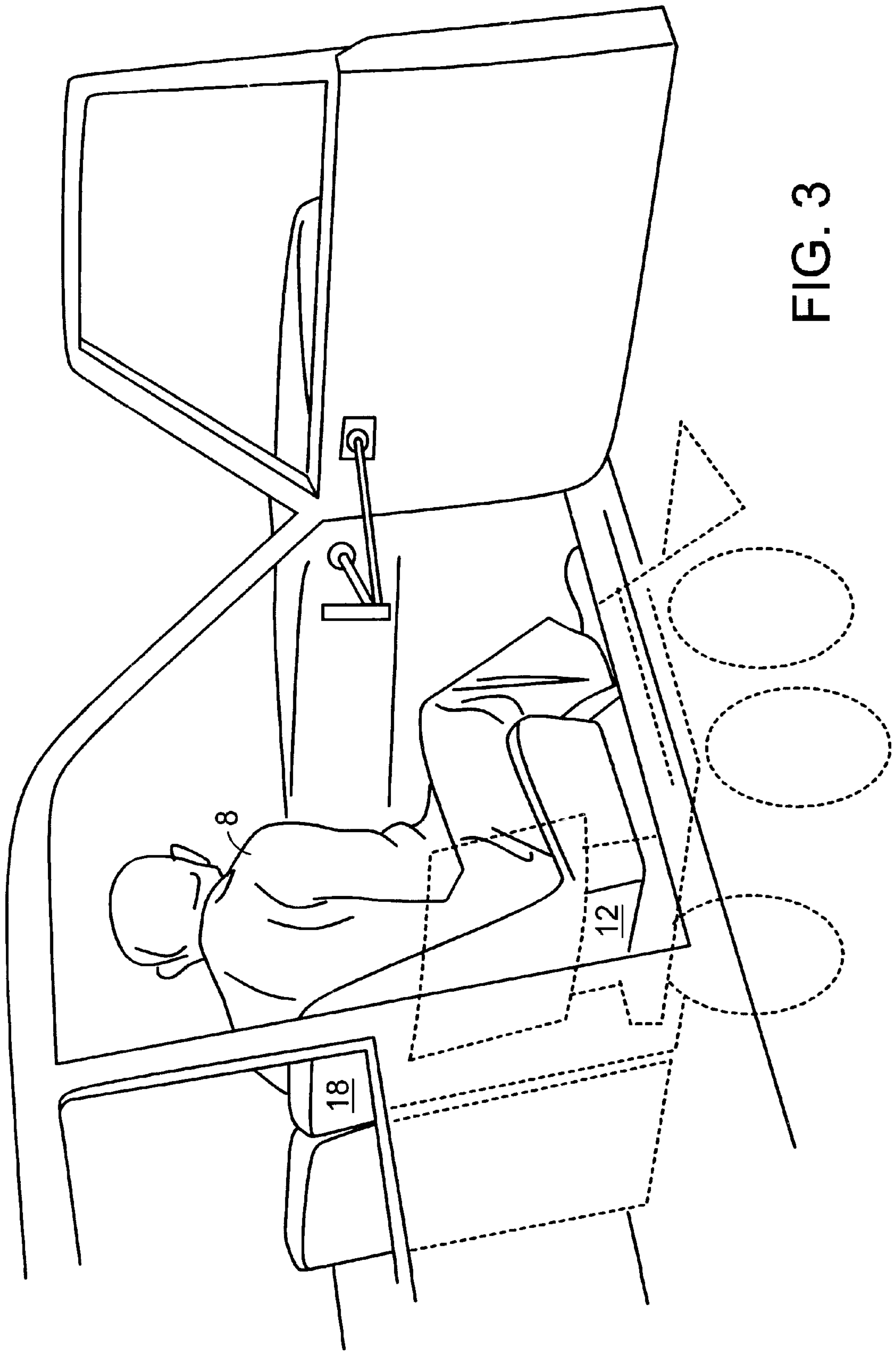
FIG. 3 shows a further step of the user transferring to an automobile in accordance with the embodiment of the invention shown in FIG. 1, with the personal vehicle shown in dashed lines.

FIG. 3 shows subject 8 having transferred into passenger seat 18. Personal vehicle 12 is shown in dashed lines for the sake of clarity. Once subject 8 has transferred into passenger seat 18, personal vehicle 12 may then be loaded into the automobile.

Figure 4:
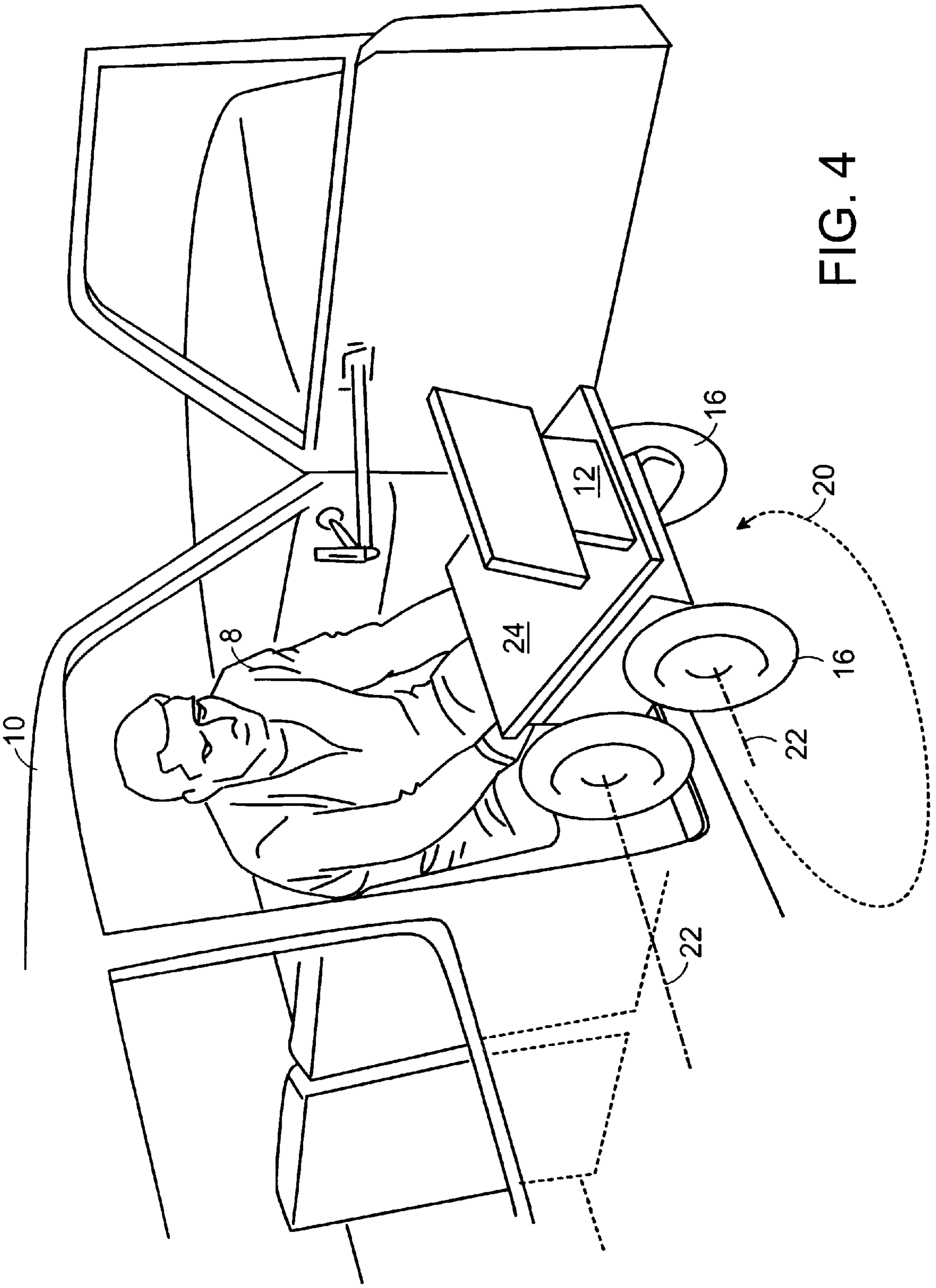
FIG. 4 shows the user rotating the orientation of the personal vehicle of FIG. 1 from within the passenger cabin, in accordance with an embodiment of the present invention.

Referring now to FIG. 4, in accordance with a preferred embodiment of the invention, personal vehicle 12 may be controlled by a person such as subject 8 who is no longer seated on the vehicle. Subject 8 may command personal vehicle 12 to turn in the direction of arc 20 so as to allow alignment of wheels 16 for ascent into automobile 10. In accordance with a preferred embodiment of the invention, personal vehicle 12 has actuator control of wheels 16 and of the position of the axes 22 of one or more wheels with respect to a support 24 of the personal vehicle. In a mode of control referred to as the "auto ingress mode," either of two submodes may be entered: In "roll mode," the wheels may roll while axes 22 remain fixed with respect to support 24. In "step mode," the position of one or more of axes 22 may be varied while some or all of the wheels may be braked. A "step/roll" switch may be provided to allow the user to toggle between these modes. Additionally, in accordance with an alternate embodiment of the invention, the height of support 24 may be adjusted by means of commands provided by the user, either by explicit activation of a force sensor, or by manually acting on the frame of the personal vehicle.

Figure 12:
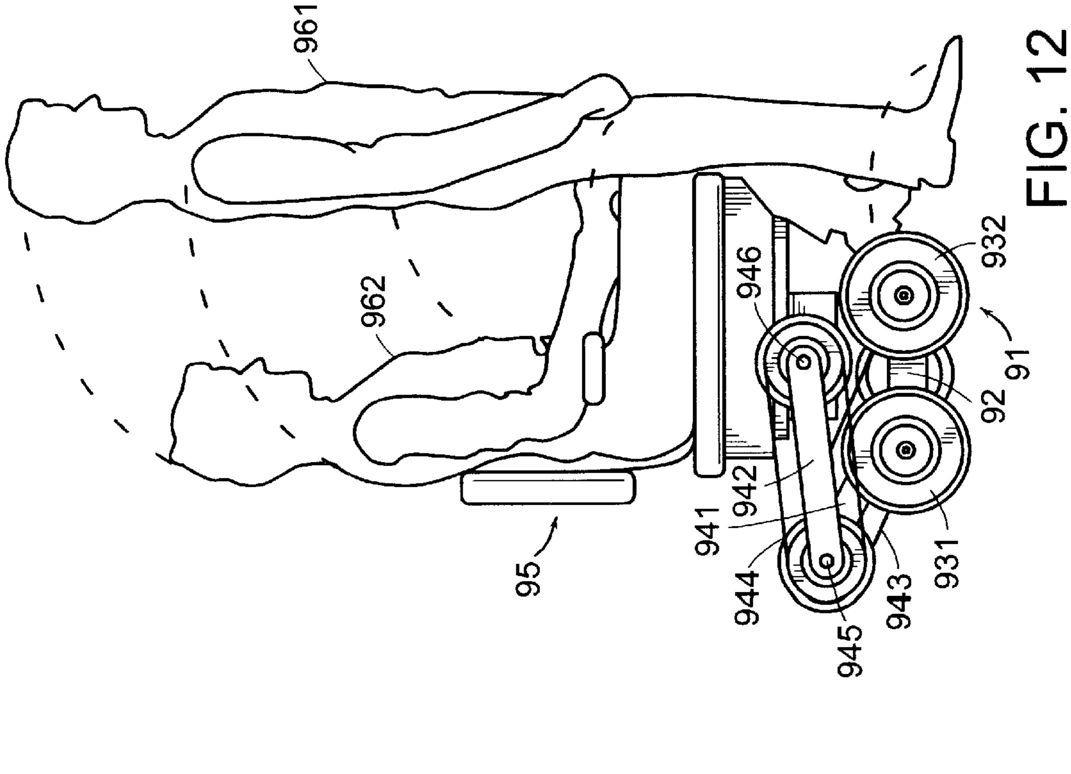
FIG. 12 shows a personal vehicle of the sort according with preferred embodiments of the present invention, with wheel axes in a first configuration.
Figure 14:
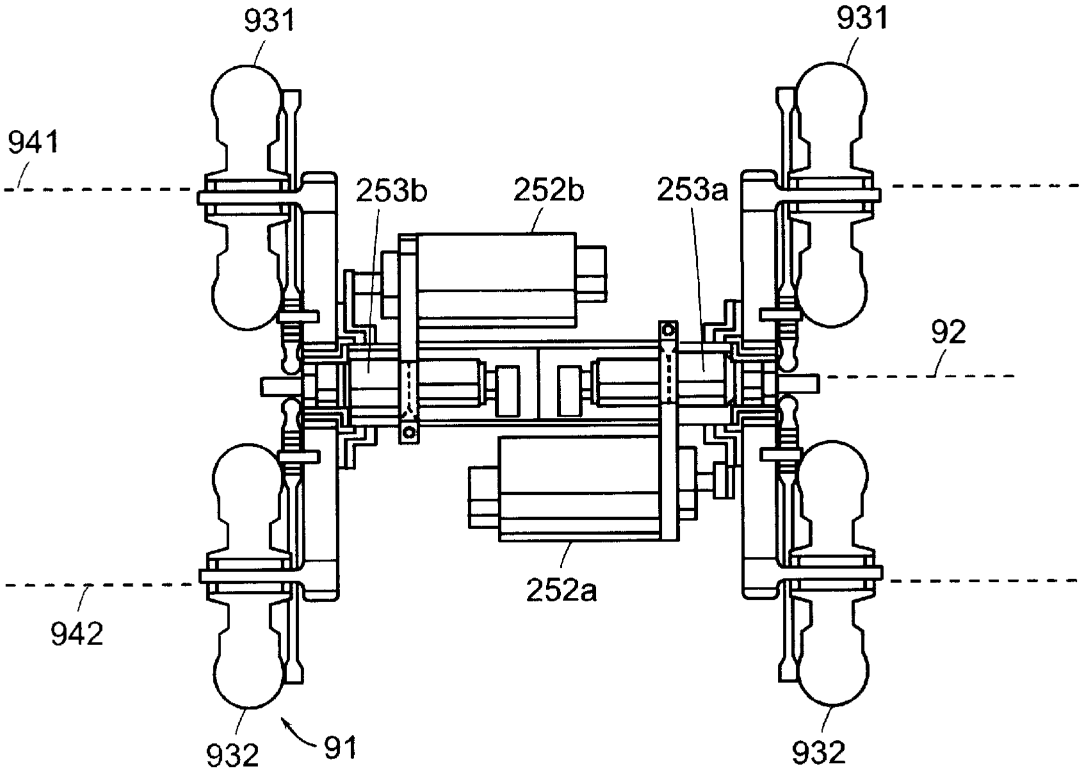
FIG. 14 shows a cross-sectional view of the wheels of the personal vehicle of FIGS. 12 and 13, along with actuators for driving the wheels and clusters.

In FIG. 12, there is shown a side view of an embodiment utilizing a two-wheel cluster design. The subject 962 is shown supported on the seat 95 of this embodiment In view is the right-hand cluster 91 with a pair of wheels 931 and 932 in radially symmetric locations about the cluster's axis 92 of rotation. A similar left-hand cluster is also employed. Each cluster has its own separately controlled motor to drive it about its axis of rotation 92. Each pair of wheels (here, 931 and 932) is also driven by a separately controlled motor about its own axis of rotation, but the wheels of a cluster are coupled to rotate synchronously. Actuators for driving wheels 931 and 932 are designated by numerals **252*a* and 252*b* in FIG. 14. A second set of actuators 253*a* and 253*b* change the positions of axes 941 and 942 about which wheels 931 and 932** rotate, respectively.

It can be seen in FIG. 12 that the cluster 91 is positioned so that both wheels 931 and 932 may be in contact with the ground. When the cluster 91 (along with the left-hand cluster) is in this position, the transporter of this embodiment is relatively stable in the fore-aft plane, thereby permitting a standing subject 961 to assume rapidly and comfortably a seated position 962 on the device.

Figure 13:
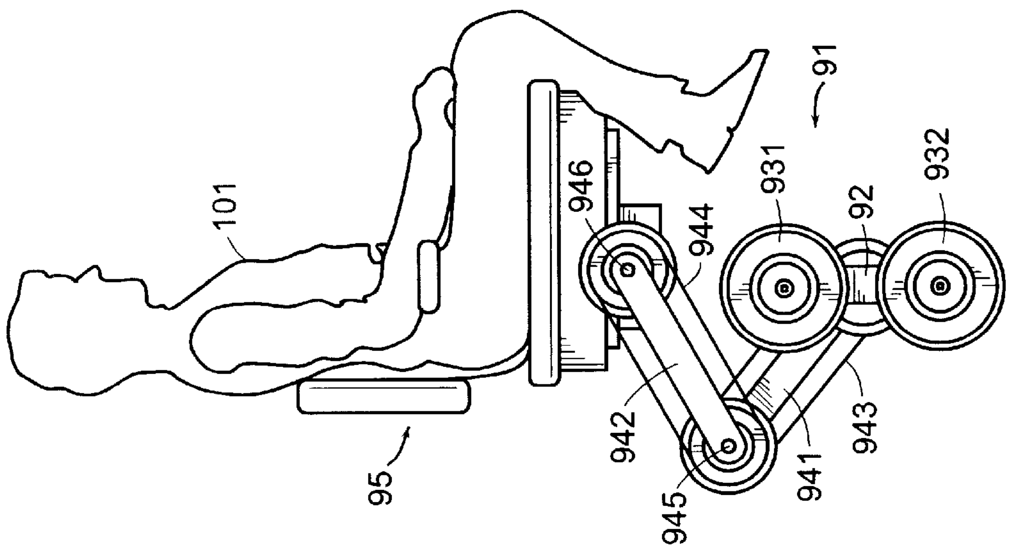
FIG. 13 shows the personal vehicle of FIG. 12 with wheel axes in a second configuration.
Figure 15:
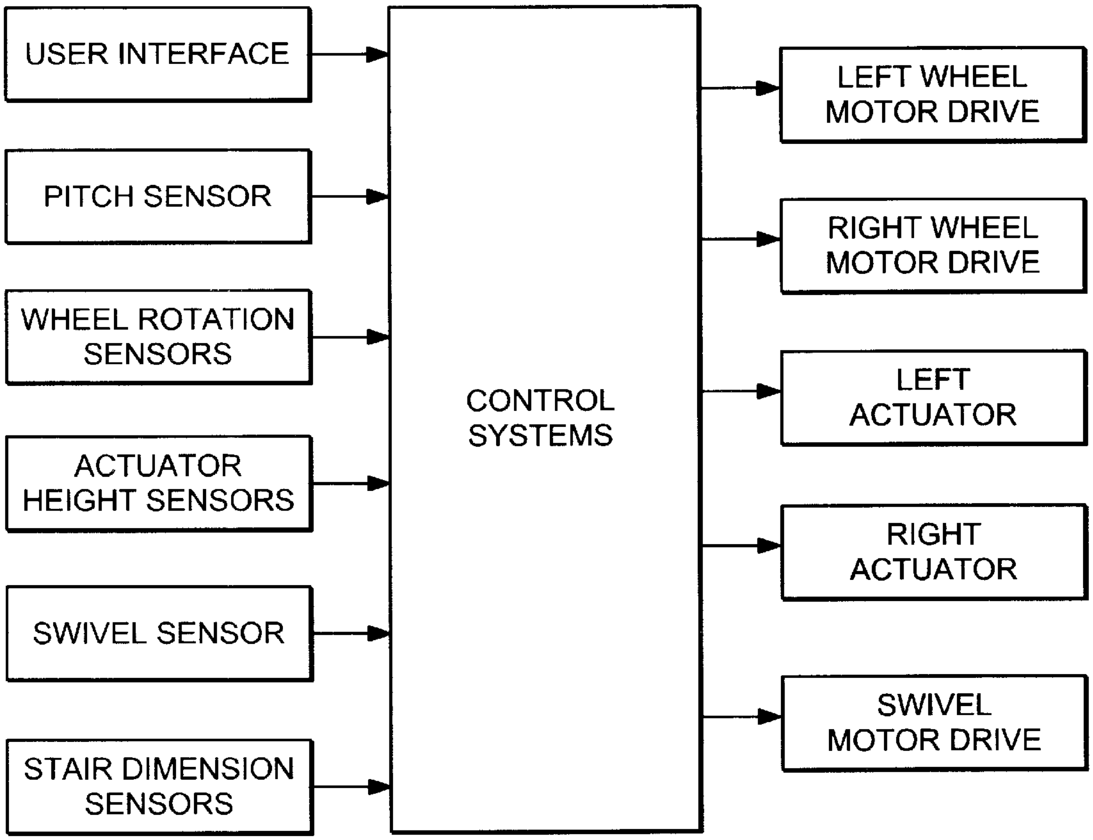
FIG. 15 is a block diagram of a control loop for driving the wheels and clusters of a personal vehicle based on control inputs.

The cluster 91, however, may be rotated about its axis 92 until only wheel 932 is in contact with the ground as shown in FIG. 13. When the cluster 91 (along with the left-hand cluster) is in this position, the transporter has the same inherent fore-aft instability as discussed in U.S. Pat. No. 5,701,965 in connection with the embodiment of FIG. 1 therein. The same equations governing the system may be used as discussed in U.S. Pat. No. 5,701,965 in order to drive the wheels to create fore-aft stability dynamically. The control loop whereby system configuration conditions are sensed and subsequently modified is depicted schematically in FIG. 15.

As additionally shown in FIGS. 12 and 13, the chair 95 may be linked to the ground-contacting members via an articulated arm having segments 941 and 942 that may be adjusted in angle with respect to each other and the seat 95. The adjustments are achieved by motorized drives disposed at hubs 945 and 946. (Such drives may, for example, be harmonic drives.) As a result of these adjustments (in addition to the effect of rotating the clusters), the height of the seat 95, among other things, may be changed.

Figure 5:
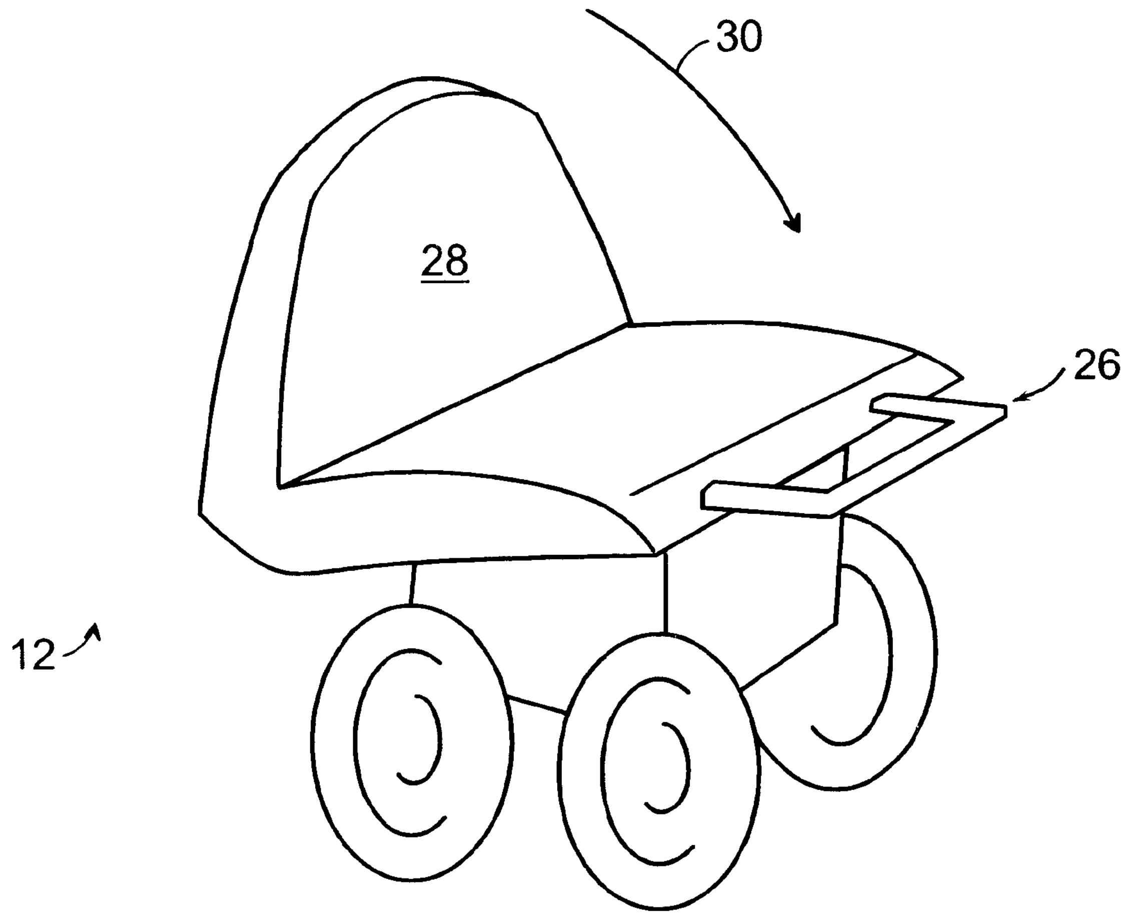
FIG. 5 is a perspective view of a personal vehicle having a force sensing handle in accordance with an embodiment of the present invention.

One means of allowing a user, no longer supported on personal vehicle 12, to govern the position and configuration of the personal vehicle is discussed with reference to FIG. 5. A force sensitive device 26 may be provided for controlling the orientation or configuration of the personal vehicle, or both, by means of motions of the hand, wrist, or body. The use of remote control units is also known and is within the scope of the invention as claimed in any appended claims. Remote control may be via wire or wireless connection to personal vehicle 12.

Figure 6:
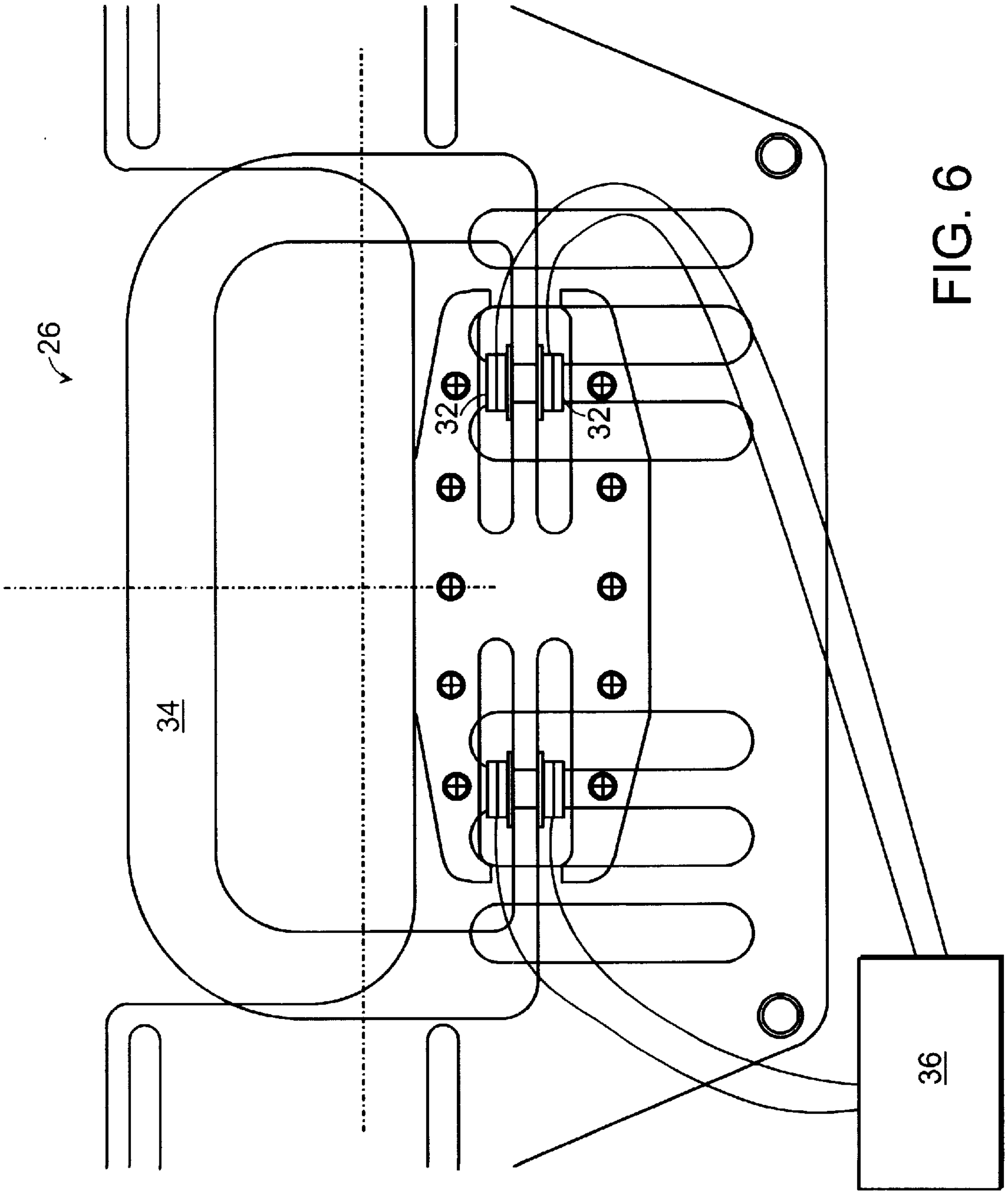
FIG. 6 is a top cross-sectional view of the force sensing handle of FIG. 5.

An embodiment of force sensitive device 26 configured in a handle configuration is shown in cross section in FIG. 6. Force sensors 32, which may be piezoelectric sensors, for example, produce electrical signals based on tensile, compressive, or torsional activation of handle 34 in any plane, as transmitted mechanically to the sensors. The electrical signals are processed by controller 36 to govern the motion, orientation, or configuration of the personal vehicle.

Referring again to FIG. 5, stowage of personal vehicle 12 may be facilitated, in accordance with alternate embodiments of the invention, by providing for the folding forward of seat back 28 along arc 30.

Figure 7:
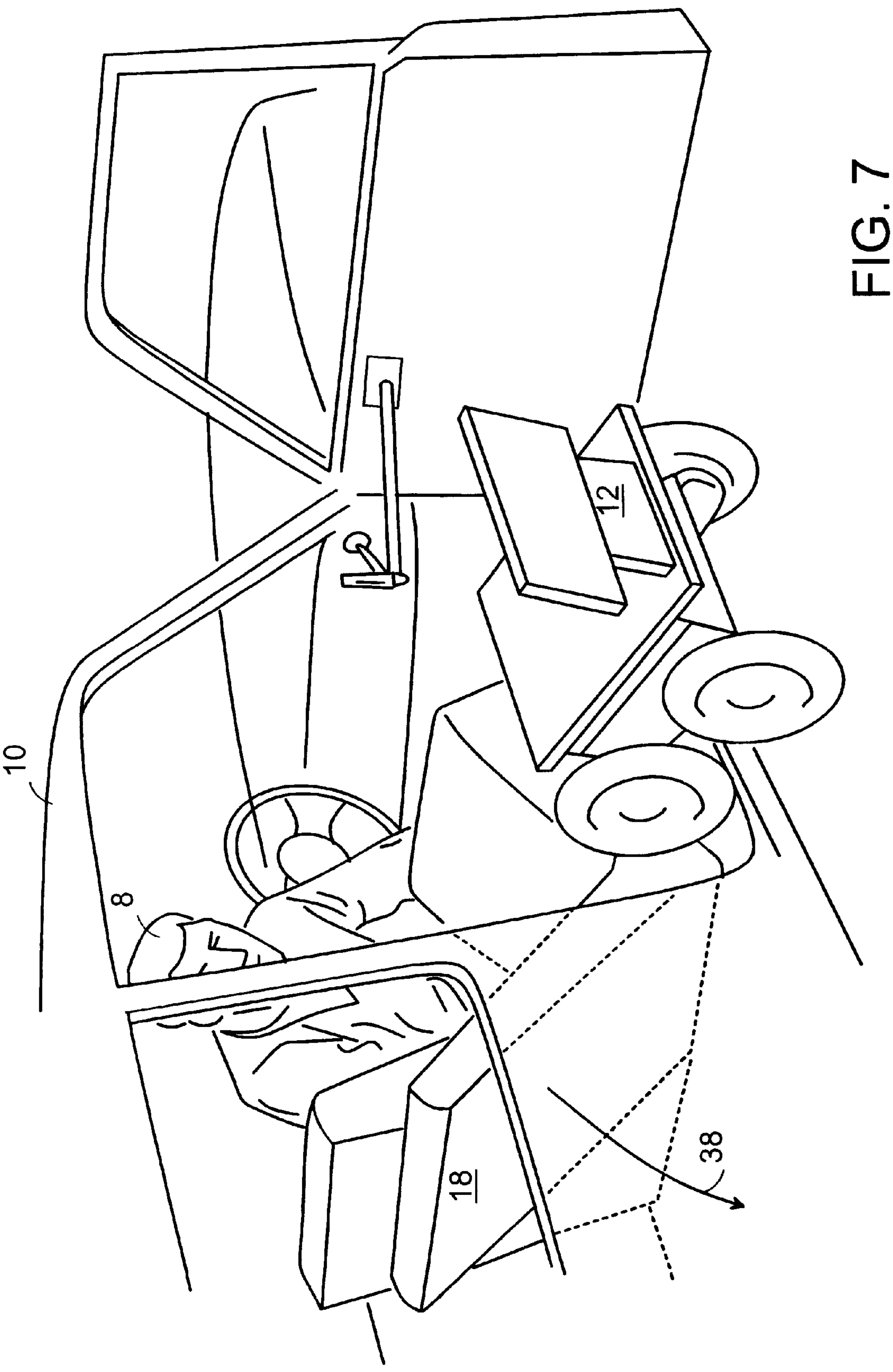
FIG. 7 shows the user retracting an automobile seat of the automobile of FIG. 1, in accordance with an embodiment of the present invention.
Figure 8:
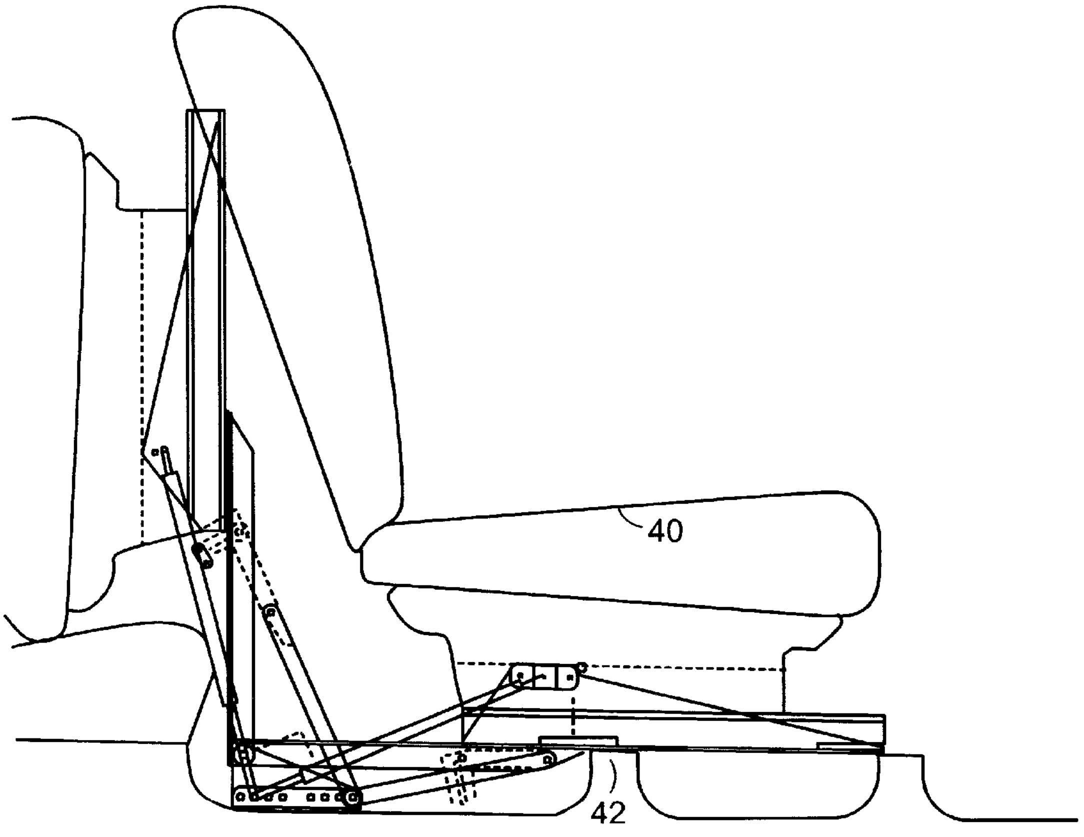
FIG. 8 is a side view in cross-section of a retractable automobile seat mechanism in accordance with an embodiment of the invention.

Referring now to FIG. 7, once personal vehicle 12 has been commanded to step up to the floor of the passenger cabin of automobile 10 using the auto ingress mode of control discussed above, subject 8 may stow passenger seat 18 by tilting it along arc 38 toward the rear of the passenger cabin. One embodiment of a retractable passenger seat 40 is shown in FIG. 8, allowing space on floor 42 of the automobile for stowage of the personal vehicle as described above.

Figure 9:
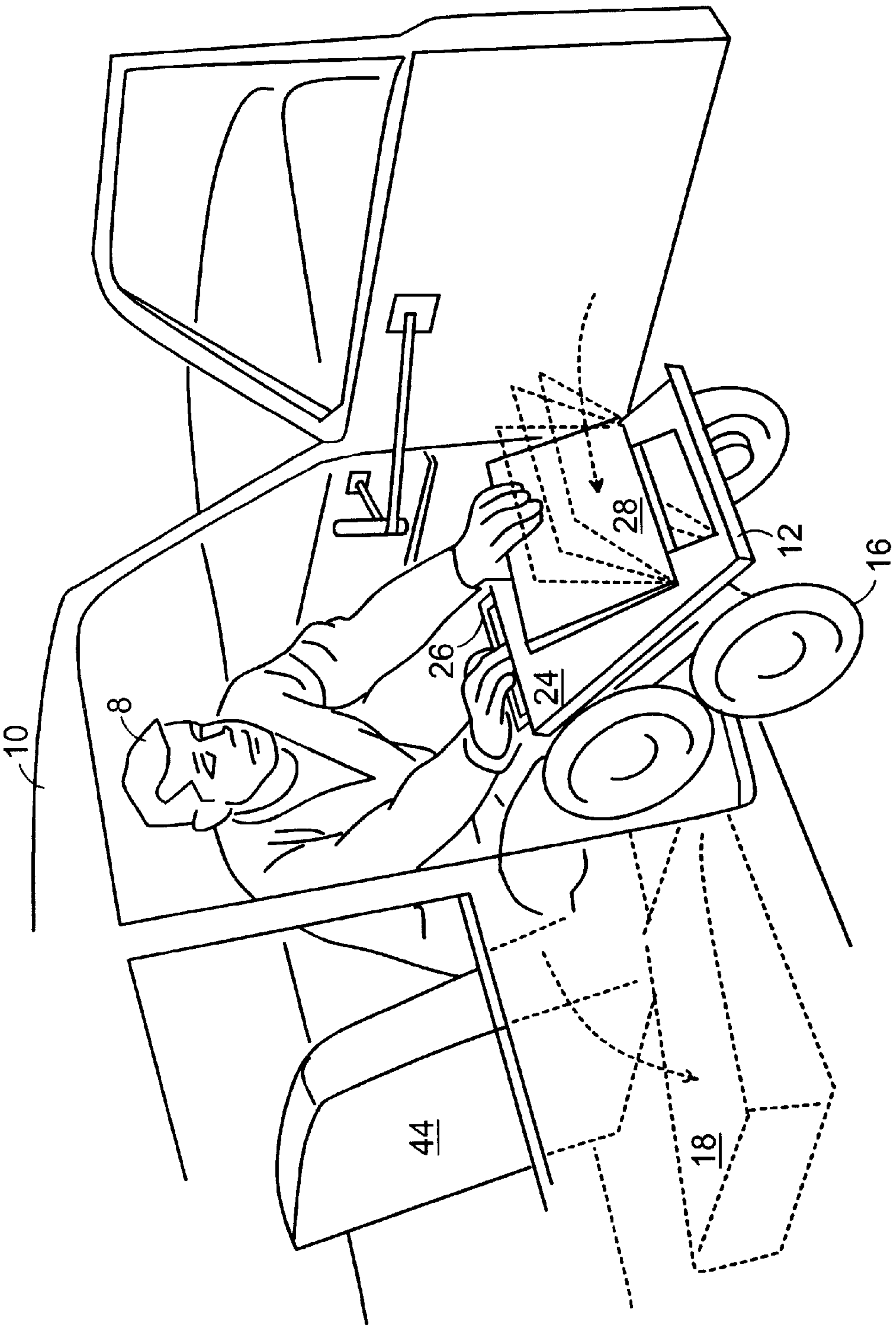
FIG. 9 shows the user causing the personal vehicle of FIG. 1 to employ a step mode of control in order to ascend to the passenger cabin for conveyance by the automobile, in accordance with an embodiment of the present invention.

Referring now to FIG. 9, once passenger seat 18 has been retracted, subject 8, from the position of driver's seat 44, may activate personal vehicle 12 by means of force handle 26 to complete its ascent into automobile 10. Support 24 may be lowered with respect to wheels 16, and folding back 28 may be lowered to lower the center of gravity of the personal vehicle while it is stowed in the automobile.

Figure 10:
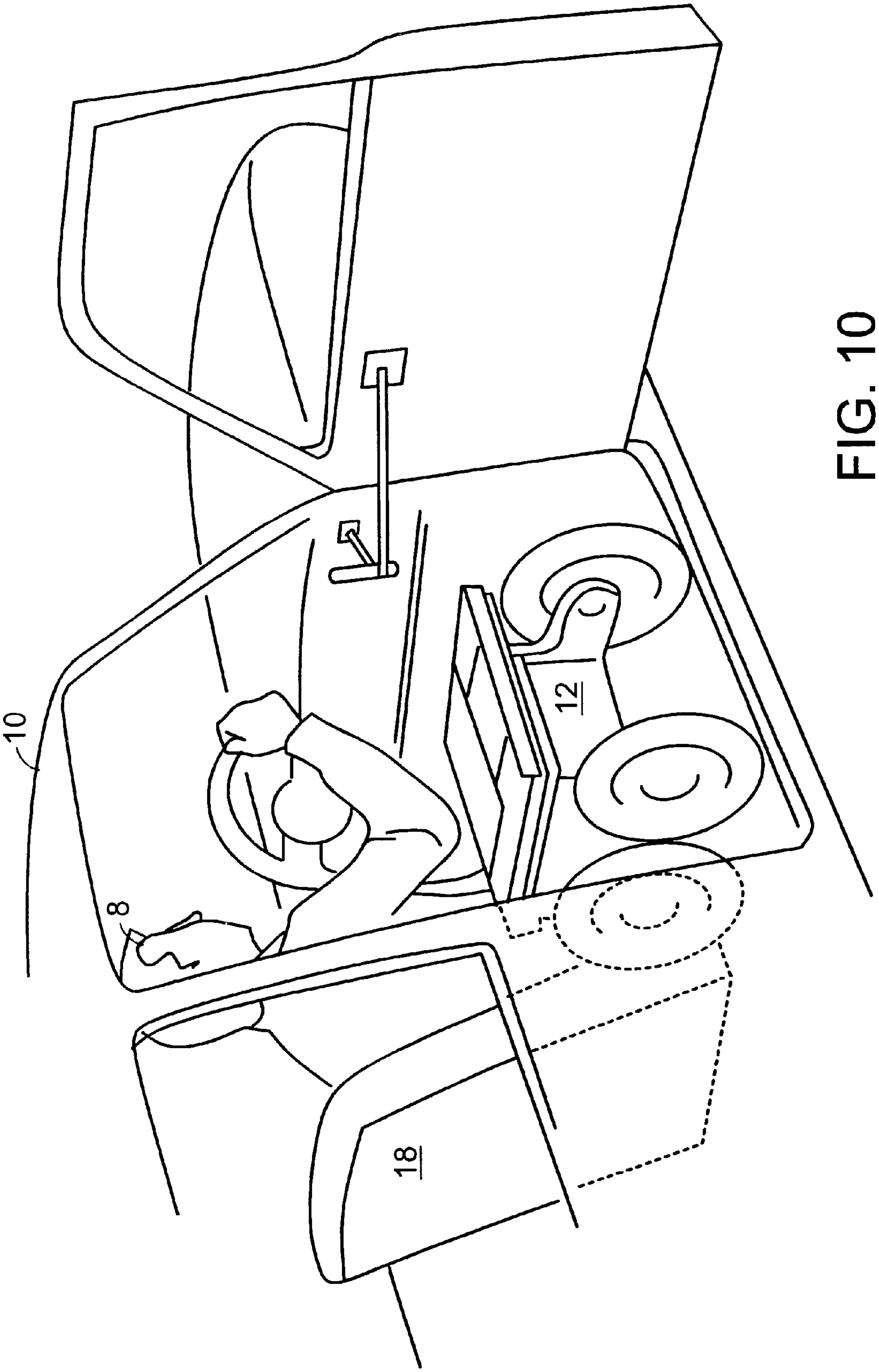
FIG. 10 shows the personal vehicle of FIG. 1 stowed within the passenger cabin for conveyance by the automobile.

FIG. 10 shows subject 8 seated in driver's seat 44 and personal vehicle 12 in a stowed position within automobile 10. In order to unload personal vehicle 12 and to alight from the automobile, subject 8 may again employ the invention by reversing the process heretofore described.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A system for enabling a person to enter and exit an enclosed vehicle and to load and unload a dynamically balanced personal vehicle into the enclosed vehicle without the assistance of another person, the system comprising:

a. the dynamically balanced personal vehicle including:
   (i) a support for supporting said person during locomotion by means of said personal vehicle;
   (ii) at least one axle characterized by a disposition with respect to the support, the axle having a wheel rotatably mounted to said axle and defining an axis of rotation along said axle;
   (iii) a first actuator coupled to the personal vehicle for driving the wheel about the axis of rotation; and
   (iv) a second actuator coupled to the personal vehicle for varying the disposition of the axis of rotation with respect to the support;

b. a control loop for energizing at least one of the first and second actuators on the basis of at least the disposition of the axis of rotation with respect to the support; and c. a control input unit for providing commands to the control loop of the personal vehicle for governing the operation of the personal vehicle from outside the personal vehicle and for causing the personal vehicle to enter and exit the enclosed vehicle by operation of the second actuator to vary the disposition of the axis of rotation during operation of the first actuator to drive the wheel.

2. A system according to claim 1, wherein the control input includes a force sensing device for governing the operation of a motorized personal vehicle, the force sensing device comprising:

a. a handle coupled to the personal vehicle for grasping by a subject;

b. at least one pressure sensor for producing an output related to forces applied to the handle; and c. a controller for varying at least one of the orientation, configuration, and motion of the personal vehicle on the basis of forces applied to the handle.

3. A system according to claim 2, wherein the at least one pressure sensor includes a piezoelectric force sensor.

4. A system in accordance with claim 1, the system further comprising:

a. a transfer mechanism deployable from inside the enclosed vehicle for supporting the person during transfer between the personal vehicle and the seat; and b. a control input unit for providing commands to the personal vehicle for governing the operation of the personal vehicle and for causing the personal vehicle to enter and exit the enclosed vehicle using only the motor of the personal vehicle.

5. A system according to claim 4, wherein the transfer mechanism includes a retractable seat disposed within the enclosed vehicle.

* * * * *